US007652960B2

(12) United States Patent
Kim

(10) Patent No.: US 7,652,960 B2
(45) Date of Patent: Jan. 26, 2010

(54) RECORDING MEDIUM, METHOD OF CONFIGURING CONTROL INFORMATION THEREOF, RECORDING AND REPRODUCING METHOD USING THE SAME, AND APPARATUS THEREOF

(75) Inventor: Jin Yong Kim, Seongnam-si (KR)

(73) Assignee: LG Electronics, Inc., Seoul (KR)

( * ) Notice: Subject to any disclaimer, the term of this patent is extended or adjusted under 35 U.S.C. 154(b) by 72 days.

(21) Appl. No.: 11/437,624

(22) Filed: May 22, 2006

(65) Prior Publication Data

US 2006/0215512 A1 Sep. 28, 2006

Related U.S. Application Data

(63) Continuation of application No. 10/918,508, filed on Aug. 16, 2004.

(30) Foreign Application Priority Data

Aug. 14, 2003 (KR) ...................... 10-2003-0056540
Sep. 14, 2003 (KR) ...................... 10-2003-0065628

(51) Int. Cl.
*G11B 5/00* (2006.01)

(52) U.S. Cl. ............... 369/47.49; 369/59.13; 369/59.11

(58) Field of Classification Search ....................... None
See application file for complete search history.

(56) References Cited

U.S. PATENT DOCUMENTS 5,361,173 A 11/1994 Ishii et al.
5,485,469 A 1/1996 Suzuki
5,502,702 A 3/1996 Nakajo
5,590,096 A 12/1996 Ohtsuka et al.
5,636,631 A 6/1997 Waitz et al.
5,764,621 A 6/1998 Choi
5,793,546 A 8/1998 Tanaka
5,835,462 A 11/1998 Mimnagh (Continued)

FOREIGN PATENT DOCUMENTS

AU 2004254437 1/2005

(Continued)

OTHER PUBLICATIONS

Office Action issued Oct. 26, 2007 by the Chinese Patent Office in counterpart Chinese Patent Application No. 200610084094.0.

(Continued)

*Primary Examiner*—Joseph Feild
*Assistant Examiner*—Joseph Haley
(74) *Attorney, Agent, or Firm*—Harness, Dickey & Pierce, P.L.C.

(57) ABSTRACT

In a recordable optical disc including at least one recording layer, write strategy information is recorded within disc control information, so that standardized disc control information can be uniformly applied to data recording and reproduction. At least one disc information is recorded as the disc control information within the management area. The disc control information is recorded per at least one write strategy type for a same writing speed and recording layer. The write strategy type recorded in the corresponding disc information is determined by recording write strategy parameters of the optionally determined write strategy type among applicable write strategy types.

35 Claims, 14 Drawing Sheets

Disc Information (112 bytes)

| Byte number | contents | Number of bytes |
|---|---|---|
| 0 | Disc Information identifier = "DI" | 2 |
| 5 | DI frame sequence number in DI block | 1 |
| ⋮ | ⋮ | ⋮ |
| P ~ 111 | Write Strategy (WS) parameters | |

00h : 1X, L0, WS1 (mandatory)
01h : 1X, L0, WS2 (optional)
02h : 1X, L1, WS1 (mandatory)
03h : 1X, L1, WS2 (optional)
04h : 2X, L0, WS1 (mandatory)
05h : 2X, L0, WS3 (optional)
06h : 2X, L1, WS1 (mandatory)
07h : 2X, L1, WS3 (optional)
⋮

U.S. PATENT DOCUMENTS 5,892,633 A 4/1999 Ayres et al.
5,914,920 A 6/1999 Yokogawa
5,959,962 A 9/1999 Matsumaru et al.
6,335,070 B1 1/2002 Tomita
6,415,435 B1 7/2002 McIntyre
6,480,450 B1 11/2002 Fujii et al.
6,487,713 B1 11/2002 Cohen et al.
6,504,806 B1 1/2003 Nakajo
6,535,470 B1 3/2003 Wu
6,580,671 B1 6/2003 Otomo et al.
6,643,233 B1 11/2003 Yen et al.
6,684,328 B2 1/2004 Matsuura
6,711,107 B2 3/2004 Chao et al.
6,868,054 B1 3/2005 Ko
6,891,786 B2 5/2005 Sato
6,894,961 B1 5/2005 Osakabe
6,996,047 B2 2/2006 Nagano
6,999,393 B2 2/2006 Yamada
7,012,878 B2 * 3/2006 Shinotsuka et al. ...... 369/275.4
7,075,871 B2 * 7/2006 Kato et al. ............... 369/47.53
7,088,667 B2 8/2006 Kobayashi
7,161,881 B2 1/2007 Pereira
7,170,841 B2 * 1/2007 Shoji et al. ............... 369/59.25
7,193,948 B2 3/2007 Furukawa et al.
7,212,480 B2 5/2007 Shoji et al.
7,218,585 B2 5/2007 Tanii et al.
7,230,907 B2 6/2007 Shoji et al.
7,286,455 B2 10/2007 Shoji et al.
7,304,938 B2 12/2007 Hwang et al.
7,345,970 B2 3/2008 Kim et al.
7,369,475 B2 5/2008 Nagai
7,376,072 B2 5/2008 Shoji et al.
7,400,571 B2 7/2008 Shoji et al.
7,414,936 B2 8/2008 Tasaka et al.
7,423,951 B2 9/2008 Shoji et al.
7,471,879 B2 12/2008 Fuchigami et al.
2001/0044935 A1 11/2001 Kitayama
2001/0053114 A1 12/2001 Miyake et al.
2001/0053115 A1 12/2001 Nobukuni et al.
2002/0021656 A1 2/2002 Tsukagoshi et al.
2002/0044509 A1 4/2002 Nakajima
2002/0048241 A1 4/2002 Kumagai et al.
2002/0048646 A1 4/2002 Tomura et al.
2002/0085470 A1 * 7/2002 Yokoi ...................... 369/59.11
2002/0089914 A1 7/2002 Nakajo
2002/0114234 A1 8/2002 Chao et al.
2002/0126604 A1 9/2002 Powelson et al.
2002/0126611 A1 9/2002 Chang
2002/0159352 A1 10/2002 Yamada
2002/0167879 A1 11/2002 Ohno
2002/0167880 A1 11/2002 Ando et al.
2003/0021201 A1 1/2003 Kobayashi
2003/0021202 A1 1/2003 Usui et al.
2003/0039187 A1 2/2003 Geutskens
2003/0048241 A1 3/2003 Shin et al.
2003/0058771 A1 3/2003 Furukawa et al.
2003/0072251 A1 4/2003 Kondo
2003/0076775 A1 4/2003 Sato et al.
2003/0086345 A1 5/2003 Ueki
2003/0086346 A1 5/2003 Fukumoto
2003/0137915 A1 7/2003 Shoji et al.
2003/0151994 A1 8/2003 Tasaka et al.
2003/0159135 A1 8/2003 Hiller et al.
2003/0223339 A1 12/2003 Taniguchi et al.
2003/0231567 A1 12/2003 Moritomo
2003/0237024 A1 12/2003 Ogawa et al.
2004/0001407 A1 1/2004 Kim et al.
2004/0004921 A1 1/2004 Lee et al.
2004/0010745 A1 1/2004 Lee et al.
2004/0013074 A1 1/2004 Lee et al.
2004/0022150 A1 2/2004 Lee et al.
2004/0030962 A1 2/2004 Swaine et al.
2004/0062160 A1 4/2004 Park et al.
2004/0076096 A1 4/2004 Hwang et al.
2004/0090888 A1 5/2004 Park et al.
2004/0114474 A1 6/2004 Park et al.
2004/0125717 A1 7/2004 Ko et al.
2004/0145980 A1 7/2004 Park et al.
2004/0184395 A1 9/2004 Lee et al.
2004/0223434 A1 11/2004 Nishimura et al.
2005/0019023 A1 1/2005 Ko
2005/0030853 A1 2/2005 Lee et al.
2005/0030870 A1 2/2005 Rijpers et al.
2005/0036425 A1 2/2005 Suh et al.
2005/0038957 A1 2/2005 Suh
2006/0221790 A1 10/2006 Suh et al.
2006/0233059 A1 10/2006 Suh et al.
2007/0088954 A1 4/2007 Furukawa et al.
2007/0115765 A1 5/2007 Kobayashi
2008/0043588 A1 2/2008 Suh et al.

FOREIGN PATENT DOCUMENTS

CN 1151071 A 6/1997
CN 1400588 3/2003
CN 1416115 5/2003
CN 1656544 8/2005
EP 0 265 984 5/1988
EP 0 552 903 7/1993
EP 0 968 769 A2 1/2000
EP 1128383 8/2001
EP 1 172 810 A2 1/2002
EP 1 244 097 A2 9/2002
EP 1298659 4/2003
EP 1308942 5/2003
EP 1 329 888 A1 7/2003
EP 1 331 361 A1 7/2003
EP 1 331 631 A1 7/2003
EP 1 361 571 A1 11/2003
EP 1369850 12/2003
EP 1 471 506 A1 10/2004
EP 1 522 994 4/2005
EP 1 605 445 A2 12/2005
JP 06-309802 11/1994
JP 09-128899 5/1997
JP 09-134525 5/1997
JP 9-147487 6/1997
JP 09-160761 6/1997
JP 9-282661 10/1997
JP 11-085413 3/1999
JP 11-85413 3/1999
JP 2000-113458 4/2000
JP 2000-163746 6/2000
JP 2001-052337 2/2001
JP 2001-297447 10/2001
JP 2001-312861 11/2001
JP 2002-050040 2/2002
JP 2002-050053 2/2002
JP 2002-074855 3/2002
JP 2002-124038 4/2002
JP 2002-230764 8/2002
JP 2002-245625 8/2002
JP 2002-352430 12/2002
JP 2002-352435 12/2002
JP 2003-006860 1/2003
JP 2003-045036 2/2003
JP 2003-178448 6/2003
JP 2003-203341 7/2003
JP 2003-257026 9/2003
JP 2004-005772 1/2004
JP 2006-507760 3/2006
KR 2001-0011557 2/2001
RU 2092910 10/1997
WO WO 97/13244 4/1997

| | | | |
|---|---|---|---|
| WO | WO 00/79525 | | 12/2000 |
| WO | WO 01/06500 | | 1/2001 |
| WO | WO 02/17308 | | 2/2002 |
| WO | WO 02/29791 | A1 | 4/2002 |
| WO | WO 02/065462 | A1 | 8/2002 |
| WO | WO 02/086887 | | 10/2002 |
| WO | WO 02/086888 | | 10/2002 |
| WO | WO 02/089123 | A1 | 11/2002 |
| WO | WO 03/010519 | A1 | 2/2003 |
| WO | WO 03/025935 | A1 | 3/2003 |
| WO | WO 03/030153 | | 4/2003 |
| WO | WO 03/046896 | | 6/2003 |
| WO | WO 03/067581 | A1 | 8/2003 |
| WO | WO 03/075265 | A2 | 9/2003 |
| WO | WO 03/105139 | A1 | 12/2003 |
| WO | WO 2004/013845 | A1 | 2/2004 |
| WO | WO 2004/015707 | | 2/2004 |
| WO | WO 2004/072966 | | 8/2004 |
| WO | WO 2005/001819 | A1 | 1/2005 |

OTHER PUBLICATIONS

Office Action issued Oct. 22, 2007 by the European Patent Office in counterpart European Patent Application No. 07016686.3-2210.

Office Action issued Oct. 1, 2007 by the Japanese Patent Office in counterpart Japanese Patent Application No. 2006-523133.

Office Action issued May 9, 2007 in counterpart European Patent Application No. 04 748 537.0-2210.

Communication issued by the European Patent Office on Jun. 8, 2007 in connection with counterpart EP Application No. 06124334.1.

International Search Report issued Feb. 11, 2005 in corresponding International Patent Application No. PCT/KR2004/002038.

Search Report for European Application No. 07120273.3 dated Jul. 2, 2008.

English translation of Russian Office Action dated Jun. 23, 2008 for counterpart Russian Application No. 2004122413/28 (024371).

Search Report for corresponding European application dated Apr. 15, 2008.

Japanese Office Action dated Mar. 17, 2009 for Japanese Application No. 2006-523136.

Office Action for corresponding Chinese Application No. 200710127832 dated Dec. 5, 2008.

Search Report dated Mar. 27, 2009 for corresponding Application No. 07017410.7-1232.

Notice of Allowance dated May 14, 2009 from Russian Patent Office for counterpart Russian application.

Standard ECMA-279, "80mm (1,23 Gbytes per side) and 120mm (3,95 Gbytes per side) DVD-Recordable Disk (DVD-R)", Dec. 1998.

Notice of Allowance dated Apr. 13, 2009 by the Russian Patent Office for counterpart Russian Application No. 2007135325/28(038623).

Notice of Allowance dated Apr. 16, 2009 by the Russian Patent Office for counterpart Russian Application No. 2006107926/28(008604).

Office Action dated Sep. 1, 2009 by the Japanese Patent Office for a counterpart Japanese application.

Notice of Allowance dated Aug. 24, 2009 by the Russian Patent Office for a counterpart Russian application.

Notice of Allowance dated Aug. 12, 2009 by the Russian Patent Office for a counterpart Russian application.

Malaysian Office Action dated Oct. 30, 2009.

Japanese Office Action dated Sep. 24, 2009 corresponding to counterpart Japanese application.

Japanese Office Action dated Sep. 4, 2009 corresponding to counterpart Japanese application.

Chinese Office Action dated Sep. 4, 2009 corresponding to counterpart Chinese application.

Chinese Office Action dated Sep. 4, 2009 corresponding to counterpart Chinese application.

Korean Office Action dated Oct. 23, 2009 corresponding to counterpart Korean application.

* cited by examiner

- ISA : Inner Spare Area
- OSA : Outer Spare Area
- PIC : Permanent Information & Control data
- TDMA : Temporary Defect Management Area Layer 0
Layer 1
Lead-In
Data Area
Lead-Out
Data Area
ISA0
User Data Area
OSA0
Outer zone0
ISA1
User Data Area
OSA1
Outer zone1
DI (Disc Information)
protection zone1
PIC
protection zone2
INFO 2
OPC & Reserved (or TDMA)
INFO 1
Pre-recorded
Re-writable(or write-once)

FIG. 4B

| Byte number | contents | Number of bytes |
|---|---|---|
| 0 | Disc Information identifier = "DI" | 2 |
| 5 | DI frame sequence number in DI block | 1 |
| N | Write Strategy (WS) Type =WS-1 (0000 0001b) | 1 |
| ⋮ | ⋮ | ⋮ |
| L to 111 | Maximum dc read power | |
| | Maximum HF modulated read power | |
| | Write power settings at Recording Velocity | |
| | Tmp write pulse duration | |
| | Ttop first write pulse duration | |
| | dTtop first write pulse start time at Recording Velocity | |
| | Te erase multi-pulse duration | |
| | dTe first erase pulse start time at Recording Velocity | |

00h (1X, Layer0 DI)

Write Strategy Parameters (WS Type = WS-1)

FIG. 5A

Disc Information (112 bytes)

| Byte number | contents | Number of bytes |
|---|---|---|
| 0 | Disc Information identifier = "DI" | 2 |
| 5 | DI frame sequence number in DI block | 1 |
| ⋮ | ⋮ | ⋮ |
| P ~ 111 | Write Strategy (WS) parameters | |

00h : 1X, L0, WS1 (optional)
01h : 1X, L0, WS2 (optional)
02h : 1X, L1, WS1 (optional)
03h : 1X, L1, WS2 (optional)
04h : 2X, L0, WS1 (optional)
05h : 2X, L0, WS3 (optional)
06h : 2X, L1, WS1 (optional)
07h : 2X, L1, WS3 (optional)
⋮

Disc Information (112 bytes)

| Byte number | contents | Number of bytes |
|---|---|---|
| 0 | Disc Information identifier = "DI" | 2 |
| 5 | DI frame sequence number in DI block | 1 |
| ⋮ | ⋮ | ⋮ |
| N | Write Strategy (WS) Type | 1 |
| K | Write Strategy (WS) flag (= 0000 1111b) | 1 |
| P ~ 111 | Write Strategy (WS) parameters | |

| b7 | b6 | b5 | b4 | b3 | b2 | b1 | b0 |
|---|---|---|---|---|---|---|---|
| WS8 | WS7 | WS6 | WS5 | WS4 | WS3 | WS2 | WS1 |
| 0b | 0b | 0b | 0b | 1b | 1b | 1b | 1b |

0b : this WS-type is not applicable
1b : this WS-type is applicable

FIG. 7

Disc Information (112 bytes)

| Byte number | contents | Number of bytes |
|---|---|---|
| 0 | Disc Information identifier = "DI" | 2 |
| 5 | DI frame sequence number in DI block | 1 |
| ⋮ | ⋮ | ⋮ |
| N | Write strategy (WS) parameters | 1 |
| K | Write Stategy (WS) flag | 1 |
| Q | Best WS flag in Writing speed | 1 |
| P ~ 111 | Write strategy (WS) parameters | |

| b7 | b6 | b5 | b4 | b3 | b2 | b1 | b0 |
|---|---|---|---|---|---|---|---|
| WS8 | WS7 | WS6 | WS5 | WS4 | WS3 | WS2 | WS1 |
| 0b | 0b | 0b | 0b | 0b | 0b | 1b | 0b |

1b : this WS−type is best

RECORDING MEDIUM, METHOD OF CONFIGURING CONTROL INFORMATION THEREOF, RECORDING AND REPRODUCING METHOD USING THE SAME, AND APPARATUS THEREOF

RELATED APPLICATION DATA

This is a continuation application of application Ser. No. 10/918,508 filed Aug. 16, 2004; the entire contents of which are hereby incorporated by reference. This application also claims the benefit of Korean Application No. 10-2003-0056540 filed on Aug. 14, 2003, and Korean Application No. 10-2003-0065628 filed on Sep. 22, 2003, the entire contents of which are hereby incorporated by reference.

BACKGROUND OF THE INVENTION

1. Field of the Invention

The present invention relates to recording media, and more particularly, to a method of recording disc control information on a recordable optical disc including at least one recording layer, in which write strategy information is included within the recorded disc control information, and to method of recording data using the disc control information recorded in a specific area of the recordable optical disc.

2. Discussion of the Related Art

A high density optical recording medium, known as HD-DVD, is widely used to record and store high-definition video data and high-quality audio data. The Blu-ray disc represents next-generation HD-DVD technology.

Technological specifications are now being established for the global standardization of the Blu-ray disc, including standards are for the write-once Blu-ray disc (BD-WO). Meanwhile, a rewritable Blu-ray disc, known as the 1×-speed BD-RE and now being discussed, should be compatible with BD-RE discs expected to have higher recording velocities, i.e., the 2×-speed BD-RE and beyond. BD-WO specifications for high recording velocity are also in progress. Efficient solutions for coping with the high recording velocity of a high-density optical disc are urgently needed, and the specifications established should ensure mutual compatibility.

SUMMARY OF THE INVENTION

Accordingly, the present invention is directed to a disc control information recording method that substantially obviates one or more problems due to limitations and disadvantages of the related art.

An object of the present invention is to provide a method of recording disc control information corresponding to high writing speed, by which write strategy information is included within disc control information prerecorded on a recording medium and by which recording on and reproducing from the recording medium can be performed based on recorded disc information.

Another object of the present invention is to provide a data structure for configuring disc control information.

Another object of the present invention is to provide a method of recording disc control information which includes write strategy information for coping with high writing speeds, to achieve compatibility between like-based recording media.

Another object of the present invention is to provide a recording medium, recording and reproducing method, and apparatus suitable for use with the above disc control information recording methods.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a data structure of a control information for use with a recording medium having at least one recording layer, wherein the control information including at least one information unit for a writing speed and recording layer, characterized in that the information unit includes write strategy parameters for first write strategy type to be used for the writing speed and recording layer, wherein the first write strategy type is one of a plurality of write strategy types applicable to the same writing speed and recording layer, and the first write strategy type is mandatory type to be used necessarily for at least the specific writing speed or a preferred type determined based on a preference among the plurality of write strategy types applicable to the same writing speed and recording layer.

In another aspect of the present invention, an optical recording medium includes the control information by the data structure.

In another aspect of the present invention, a recording method includes steps of reading a control information, the control information including at least one information unit for a writing speed and recording layer, characterized in that the information unit includes write strategy parameters for first write strategy type to be used for the writing speed and recording layer, wherein the first write strategy type is one of a plurality of write strategy types applicable to the same writing speed and recording layer, and the first write strategy type is mandatory type to be used necessarily for at least the specific writing speed or a preferred type determined based on a preference among the plurality of write strategy types applicable to the same writing speed and recording layer; and recording data on a specific recording layer at a specific writing speed based on the at least one information unit.

In another aspect of the present invention, A recording method includes steps of reading a control information, the control information including first information unit for a writing speed and recording layer and second information unit for the same writing speed and recording layer, characterized in that the first information unit includes write strategy parameters for first write strategy type to be used for the writing speed and recording layer, wherein the first write strategy type is one of a plurality of write strategy types applicable to the same writing speed and recording layer, and the first write strategy type is mandatory type to be used necessarily for at least the specific writing speed or a preferred type determined based on a preference among the plurality of write strategy types applicable to the same writing speed and recording layer, and the second information unit for the same writing speed and recording layer includes write strategy parameters for second write strategy type different from the first write strategy type, wherein the second write strategy type is an optionally or alternative type to use optionally or alternatively for at least the same writing speed; and recording data on a specific recording layer at a specific writing speed based on at least one information unit among the first information unit and the second information unit.

In another aspect of the present invention, an optical disc comprising at least one recording layer provided with a recordable area and a recording-disabled or prerecorded area is characterized in that a plurality of disc informations are recorded within the prerecorded area, a plurality of the disc informations are arranged in a specific order per a writing speed and per the recording layer, at least one of a plurality of the disc informations is recorded for a same writing speed and recording layer according to a write strategy type, and a preferred WS information decided in an optional manner is recorded in a front one of a plurality of the disc informations recorded for the same writing speed and recording layer.

In another aspect of the present invention, an optical disc recording method includes the steps of if an optical disc having at least one recording layer is loaded, reading a plurality of disc control informations and reading to store write strategy parameters fitting a corresponding writing speed recorded within each of a plurality of the disc control informations wherein a plurality of the disc control informations are arranged within a management area of the optical disc in a specific order per a writing speed and recording layer and wherein at least one of a plurality of the disc informations is recorded according to a write strategy type for a same writing speed and recording layer and performing a recording on a specific recording layer at a specific writing speed by referring to the disc control informations for a specific writing speed and recording layer among a plurality of the stored disc informations using the disc information including a preferred write strategy therein among the corresponding disc informations preferentially.

In another aspect of the present invention, a recording method includes steps of reading a control information, the control information including first information unit for a lower writing speed and a recording layer, characterized in that the first information unit includes write strategy parameters for first write strategy type to be used for the writing speed and recording layer, wherein the first write strategy type is one of a plurality of write strategy types applicable to the same writing speed and recording layer, and the first write strategy type is mandatory type to be used necessarily for at least the specific writing speed or a preferred type determined based on a preference among the plurality of write strategy types applicable to the same writing speed and recording layer, and second information unit for a higher writing speed and the same recording layer, the second information unit includes write strategy parameters for second write strategy type to be used for the higher writing speed and the same recording layer, wherein the second write strategy type for the higher writing speed is the same as the first write strategy type or a write strategy type different than the first write strategy type, and the first write strategy type for the higher writing speed is mandatory type to be used necessarily for at least the higher writing speed or a preferred type determined based on a preference among the plurality of write strategy types applicable to the higher writing speed and the same recording layer; and recording data on a specific recording layer at a specific writing speed based on at least one information unit among the first and second information units.

In another aspect of the present invention, a recording apparatus includes a controller for generating a recording command; and a recorder/reproducer for performing a recording, based on the generated recording command, by reading a control information, the control information including at least one information unit for a writing speed and recording layer, characterized in that the information unit includes write strategy parameters for first write strategy type to be used for the writing speed and recording layer, wherein the first write strategy type is one of a plurality of write strategy types applicable to the same writing speed and recording layer, and the first write strategy type is mandatory type to be used necessarily for at least the specific writing speed or a preferred type determined based on a preference among the plurality of write strategy types applicable to the same writing speed and recording layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 4A-4E are diagrams of a sample data structure of disc control information recorded according to a first embodiment of the present invention;

FIGS. 5A and 5B are diagrams of a sample data structure of disc control information recorded according to a second embodiment of the present invention;

FIGS. 6A & 6B and FIG. 7 are diagrams of another sample data structure of disc control information recorded according to the second embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. For convenience of explanation, a Blu-ray disc (BD) is taken as an example of an optical disc according to the present invention. Yet, it is apparent that the concept of the present invention, which is characterized in an optical disc having its disc control information recorded thereon, is applicable to DVD-RAM/-RW/+RW/-R/+R and the like for example in the same manner.

Besides, although terms used in the present invention are possibly selected from the currently well-known ones, some terms are arbitrarily chosen by the applicant in some cases so that their meanings are explained in detail in the following description. Hence, the present invention should be understood with the intended meanings of the corresponding terms chosen by the applicant instead of the simple names or meanings of the terms themselves.

First of all, ‘disc control information’ in the description of the present invention means an area including various information for disc record playback or information for disc record playback. And, the disc control information is commonly designated information provided to a prerecorded area within a disc or to an embossed area for a disc user by a disc manufacturer. Yet, the disc control information is provided not only to the prerecorded area but also to a recordable area. The disc information within the prerecorded or embossed area can be copied to the recordable area as well. And, they are just exemplary.

For instance, the disc control information is called 'disc information' in BD or 'physical format information' in DVD-RAM/-RW/+RW/-R/+R. Hence, it is apparent that the technical background of the present invention is identically applicable to 'physical format information' in DVD-RAM/-RW/+RW/-R/+R. For convenience of explanation, 'disc information (hereinafter abbreviated DI)' corresponding to a case of Blu-ray disc (BD) is taken as an example.

Figure 1:
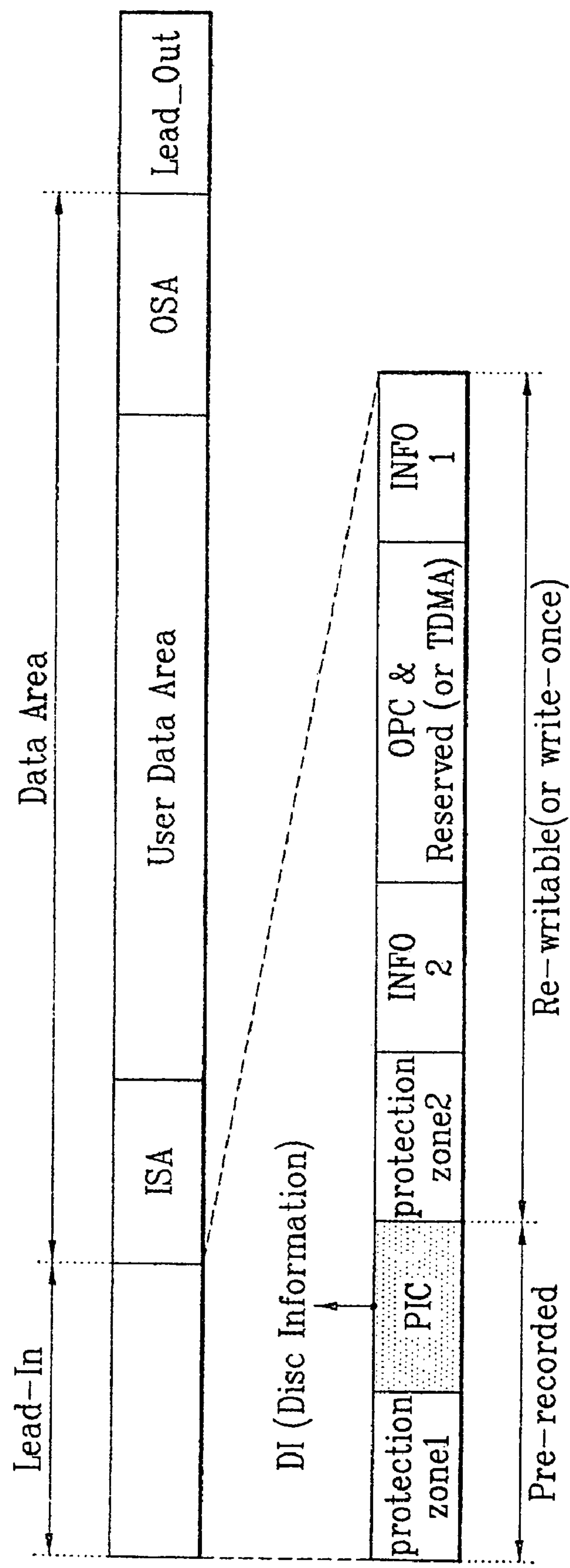
FIG. 1 is a diagram of a single-layer disc applicable to the present invention.
Figure 2:
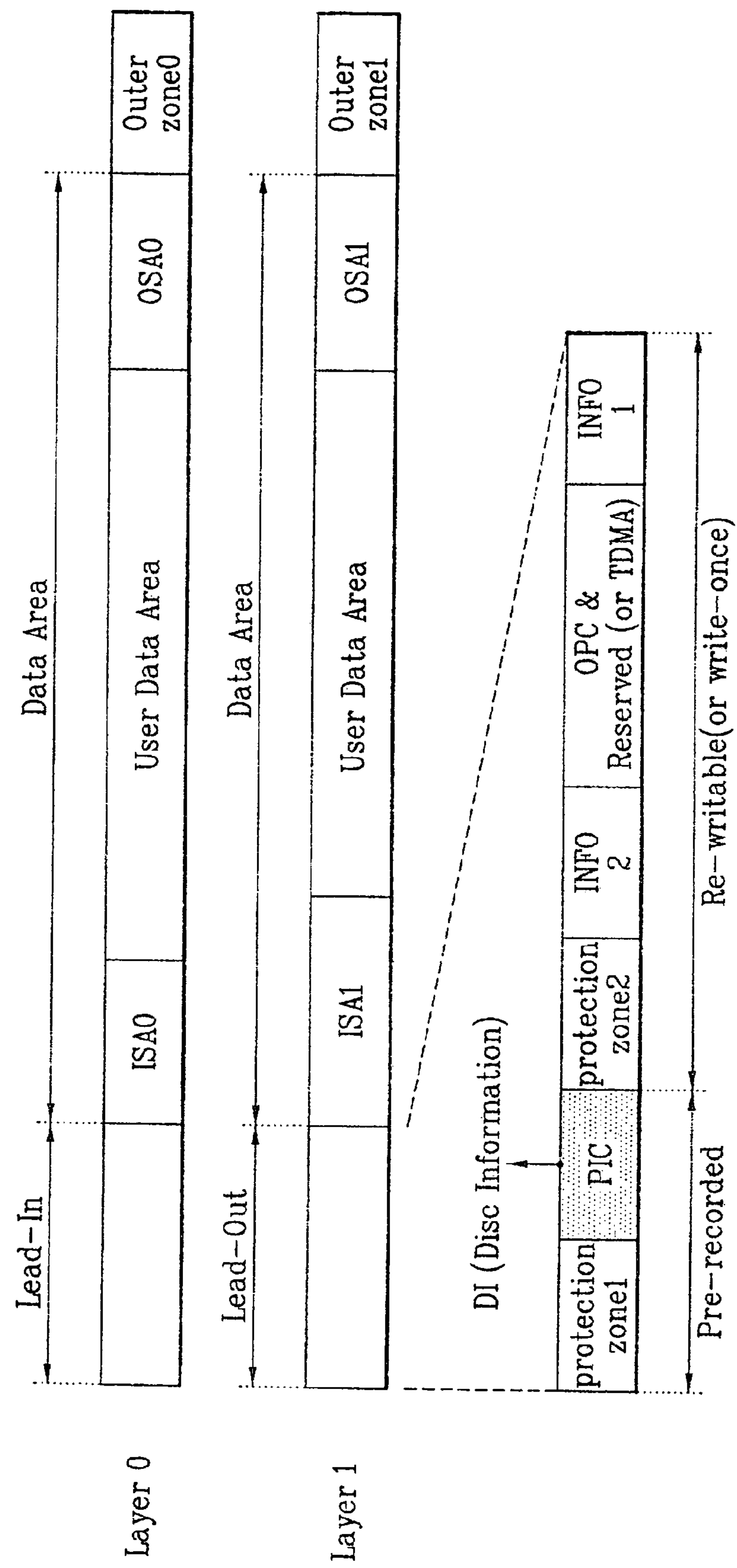
FIG. 2 is a diagram of a dual-layer disc applicable to the present invention.

FIG. 1 and FIG. 2 are structural diagrams of optical discs according to the present invention, in which a recordable optical disc is enough to be the optical disc applicable to the present invention. Moreover, the recordable disc can be any one of a rewritable optical disc, a write-once optical disc, and the like.

FIG. 1 is a structural diagram of a single-layer disc having one recording layer according to the present invention.

Referring to FIG. 1, a lead-in area is provided as a management area on an inner circumference area of an optical disc, whereas a lead-out area is provided as a management area on an outer circumference area of the optical disc. Specifically, a prerecorded area and a rewritable or write-once area are separated from each other within the inner circumference area of the disc.

The prerecorded area is an area (called 'embossed area') where data was already written in manufacturing the disc, whereby a user or system is unable to perform data writing on the prerecorded area at all. In BD-RE/WO, the prerecorded area is named PIC (permanent information and control data) area. And, the above-described disc information (hereinafter called 'DI') as information required for disc recording is recorded in the PIC area.

In a data area, provided are a user data area where user's real data is recorded and spare areas ISA and OSA to replace a generated defect area. Specifically, TDMA (temporary defect management area) for recording information of defect and general managements is provided to such a write-once optical disc as BD-WO. In case of the re-writable BD (BD-RE), TDMA is unnecessary so that such an area is left as a reserved area.

The present invention intends to provide a method of efficiently recording disc information (DI) as disc control information required for record playback of a disc in the prerecorded or recordable area. It is apparent that a recording method in the prerecorded area is differently applied to each kind of discs. In case of BD-RE/WO, the PIC area as the prerecorded area is recorded by biphased high frequency modulated signals, the high frequency modulated signals in the corresponding area are played back according to a specific playback method, and information is acquired from the playback.

FIG. 2 is a diagram of a dual-layer disc having dual recording layers, in which a recording layer starting with a lead-in is named a first recording layer Layer0 and a recording layer ending with a lead-out is named a second recording layer Layer1.

In the dual-layer disc, the PIC area is provided to lead-in and lead-out areas of a disc inner circumference area, and disc information (DI) of the same contents is recorded in the PIC area.

Figure 3:
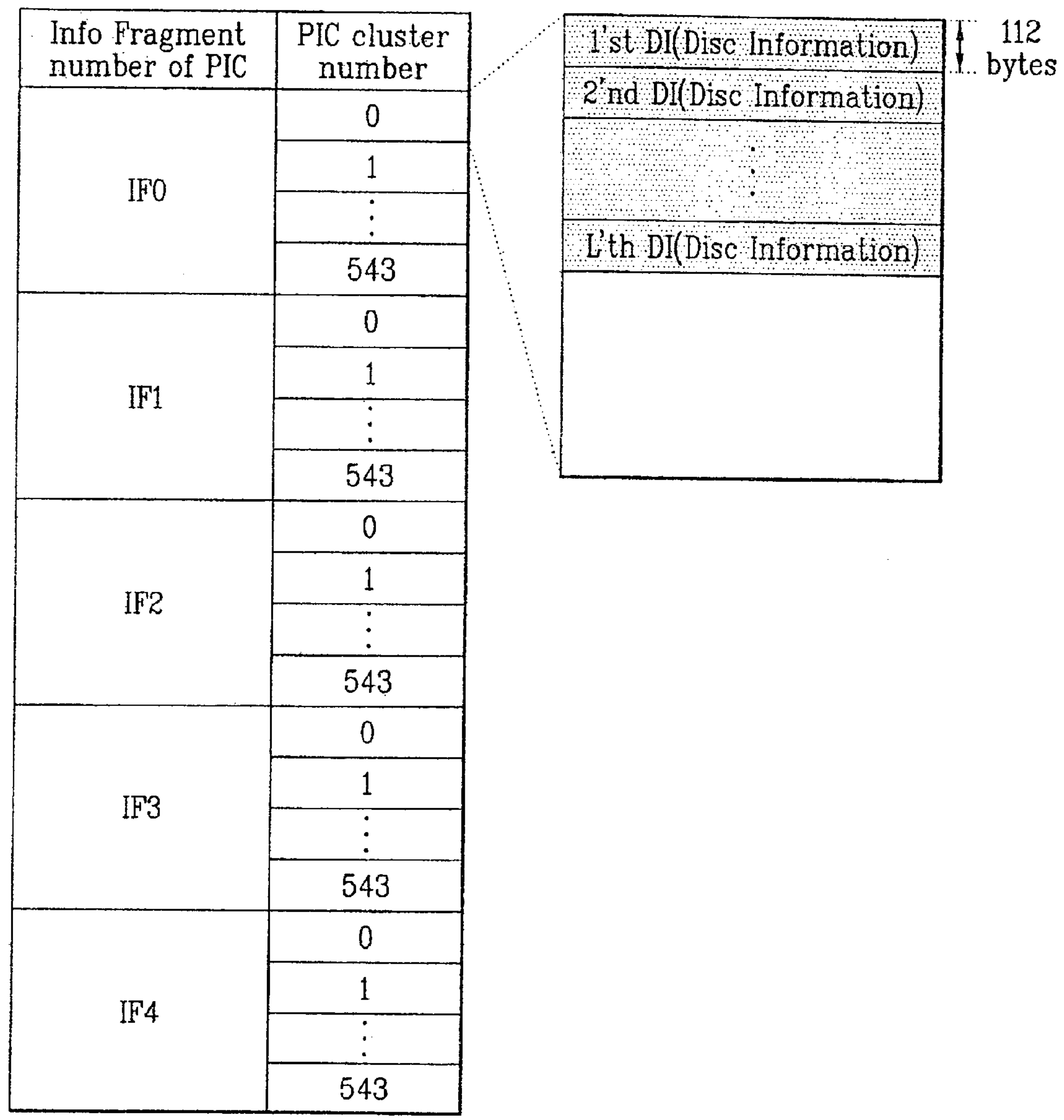
FIG. 3 is a diagram of a management area where disc control information of the present invention is recorded, illustrating a disc information recording format.

FIG. 3 is a structural diagram of a PIC area in the disc shown in FIG. 1 or FIG. 2. As mentioned in the foregoing description, it means that information can be rearranged like the structure of the PIC area in FIG. 3 when the entire information within the high frequency modulated PIC area is acquired.

A method of configuring disc information (DI) in the PIC area is explained in detail as follows.

In BD-RE/WO, 'one cluster' represents a minimum record unit, five hundred forty-four clusters gather to construct one fragment as one upper record unit, and total five fragments gather to form the PIC area. Disc information is recorded in a front head cluster of a first fragment IF0. The disc information is plurally recorded per recording layer and writing speed permitted by the corresponding optical disc, and one disc information includes one hundred twelve bytes. Specifically, disc information constructed with 112-bytes is called disc information (DI) frame. Moreover, the same contents of the disc information are repeatedly recorded in each front head cluster of the rest of the fragments, thereby enabling to cope with loss of the disc information.

Information representing the corresponding recording layer, information representing writing speed, and write strategy information corresponding to the writing speed are recorded within each disc information. Hence, such information is utilized in record playback of the corresponding optical disc, thereby enabling to provide optimal write power per recording layer and per writing speed.

Namely, the disc information (DI) of the present invention is characterized in providing specific writing speed information supported by the corresponding disc and associated write strategy information, and more specifically, in providing specific writing speed supported for each recording layer and associated write strategy information via a specified method in case that a plurality of recording layers exist in the corresponding disc.

And, the specific configuration of the disc information (DI) relates to that of Blu-ray disc (BD). It is also apparent that a DVD based disc may have a configuration different from the above-explained structure. Specifically, if a size of disc information (DI) corresponds to that of BD, it is 112 bytes equivalently for example. Yet, by regarding disc information (DI) of the same recording layer as one information to provide once without repeating common information, it may be able to configure the write strategy differing per writing speed only in addition.

Various embodiments for a method of configuring disc information and a method of recording specific information and the like within disc information according to the present invention are explained in detail by referring to the attached drawings as follows.

FIGS. 4A to 4E are diagrams of recording disc information of an optical disc according to a first embodiment of the present invention, in which one of a plurality of write strategy (WS) types defined by a specification is recorded on a corresponding disc information.

Figure 4A:
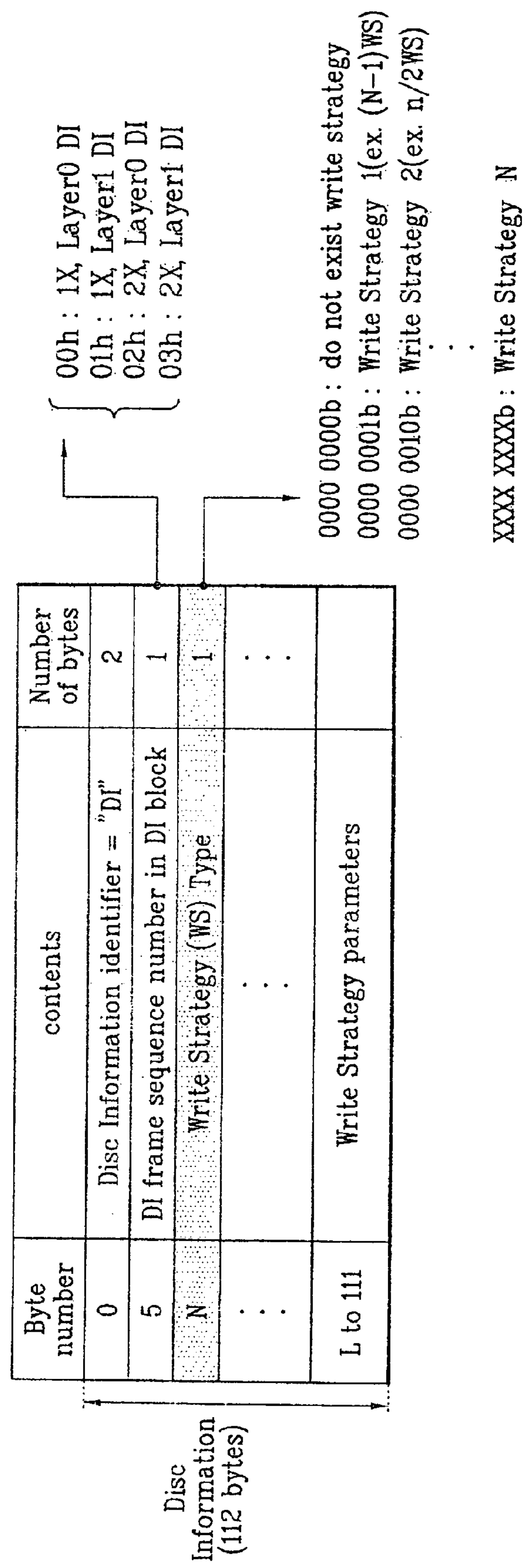

FIG. 4A shows a concept of recording disc information of an optical disc according to a first embodiment of the present invention.

Referring to FIG. 4A, a plurality of disc informations are recorded within a disc, a record sequence of each disc information is decided by a sequence number, and the record sequence is recorded by 1-byte. For instance, the corresponding information is recorded in $5^{th}$ byte within the disc information, which is named 'DI frame sequence number in DI block' field and is briefly indicated by '00h, 01h, 02h, 03h . . . . '.

Namely, the information of the $5^{th}$ byte is defined in a following manner. First of all, if the information of the $5^{th}$ byte is '00h', '00h' means $1^{st}$ disc information as well as disc information of 1× speed of a first recording layer Layer0. '01h' means $2^{nd}$ disc information as well as disc information of 1× speed of a second recording layer Layer1. '02h' means $3^{rd}$ disc information as well as disc information of 2× speed of the first recording layer Layer0. And, '03h' means $4^{th}$ disc information as well as disc information of 2× speed of the second recording layer Layer1.

Hence, the disc information is preferentially arranged in a recording velocity order and is then configured in a per recording layer order. Yet, this is just exemplary. On the contrary, the recording layer order can be preferred to the recording velocity order in configuring disc informations.

Moreover, write strategy (WS) interoperating with recording velocity meant by the corresponding disc information is recorded in a specific area, e.g., area named 'Write Strategy parameters' field as $L^{th}$~$111^{th}$ bytes, within the disc information. And, identification information enabling to identify a type or kind of the recorded write strategy (WS) recorded in the $L^{th}$~$111^{th}$ bytes is recorded in another specific area, e.g., area named 'Write Strategy type' field as $N^{th}$ byte, within the disc information.

Considering the meaning of 'write strategy (WS)', a medium property of a recording layer is generally modified by applying a laser beam to the recording layer within an optical disc via a pickup ('11' in FIG. 8) to perform a recording thereof. Hence, it should be decided a strength (write power) of the laser beam, a time of applying the write power thereto, and the like. The above-decided various kinds of write strategies are named 'Write Strategy (WS)' in general and specific contents recorded within a specific 'Write Strategy (WS)' are named 'Write Strategy (WS) parameters'.

Write strategy (WS) information used in the present invention means the entire information associated with write strategy (WS). And, 'WS parameters' means items and specific numeric values configuring WS and is a sort of WS information. Hence, the WS information has an inclusive concept of including the above-described 'WS Type', 'WS flag' that will be explained later, and the like as well as the WS parameters.

And, the write strategy (WS) can be recorded in various ways. As a disc tends to be highly densified and to run at higher speed, a writing speed, i.e., disc RPM) as well as the medium property of the recording layer is considerably affected. Hence, a more accurate system is requested. And, the various write strategies (WS) are explained as follows for example.

First of all, there is a system having a recording pulse smaller by 1 than a recording mark size (n) formed on a recording layer medium, which may be called '(n−1) WS'. For example, if a mark has a length 7T, it requires 6 pluses to form the 7T according to the (n−1)WS. In that case, a time of each write pulse or a level of write power is defined by the write strategy parameters recorded in the corresponding disc information. Secondly, there is a system having a recording pulse having a size amounting to a half of the recording mark size (n), which may be called 'n/2 WS'. For example, if a mark has a length 7T, it requires 3 pluses to form the 7T according to the (n−1)WS. That is, a decimal fraction of the result is discarded and the integer numbers of pluses are only available. In that case, a time of each write pulse or a level of write power is defined by the write strategy parameters recorded in the corresponding disc information. The respective write strategy parameters for each write strategy type may have different values each other. Besides, new write strategies (WS) keep being developed. Regarding the different types of write strategies (WS), when there exist the various systems of the write strategy (WS) as parameters applied to the write strategies (WS) differ from each other, a disc manufacturer tests the write power according to the write strategy (WS) and then records a result of the test in 'WS parameters' field of the $L^{th}$~$111^{th}$ bytes within the disc information and WS type information in $N^{th}$ byte.

If there exist N-types of write strategies (WS), the identification information allocates a specific recognition value to each write strategy (WS) to define as follows. For instance, '0000 0001b' means $1^{st}$ WS (Write Strategy-1 or WS-1). '0000 0010b' means $2^{nd}$ WS (Write Strategy-2 or WS-2). 'XXXX XXXXb' means $N^{th}$ WS (Write Strategy-N or WS-N).

In the present invention, $1^{st}$ WS (WS-1) is defined by the above-explained '(n−1) WS' and $2^{nd}$ WS (WS-1) is defined by '(n/2) WS', for example.

Moreover, if the 'WS Type' field is set to '0000 0000b', it can be defined to mean that a specific WS type fails to exist as well as WS parameters within disc information. Namely, the 'WS Type' field of the $N^{th}$ byte can be utilized as information indicating that there exists no WS as well as information designating the WS type.

FIG. 4B shows an example of recording disc information for a specific write strategy (WS), in which a disc manufacturer selects to record $1^{th}$ WS (WS-1) from WSs (write strategies) according to various specifications in recording a write strategy (WS) for 1× speed within 1× speed disc information of a first recording layer.

Namely, if 'WS Type' field of $N^{th}$ byte of disc information is '000 0001b' means $1^{st}$ WS (WS-1), parameter values corresponding to the WS-1 are written in 'Write Strategy parameters' field of $L^{th}$~$111^{th}$ bytes.

Hence, in case that a disc manufacturer selects to record $2^{nd}$ WS (WS-2), '0000 0010b' is written in the 'Write Strategy Type' field and parameters fitting the $2^{nd}$ WS will be written in the $L^{th}$~$111^{th}$ bytes. The parameters written in the $L^{th}$~$111^{th}$ bytes have different values from each other according to the write strategy (WS) type. And, the corresponding write strategy (WS) parameters are previously determined as specified information fitting the characteristics of the disc and will be provided to a disc manufacturer or a system designer.

Figure 4C:
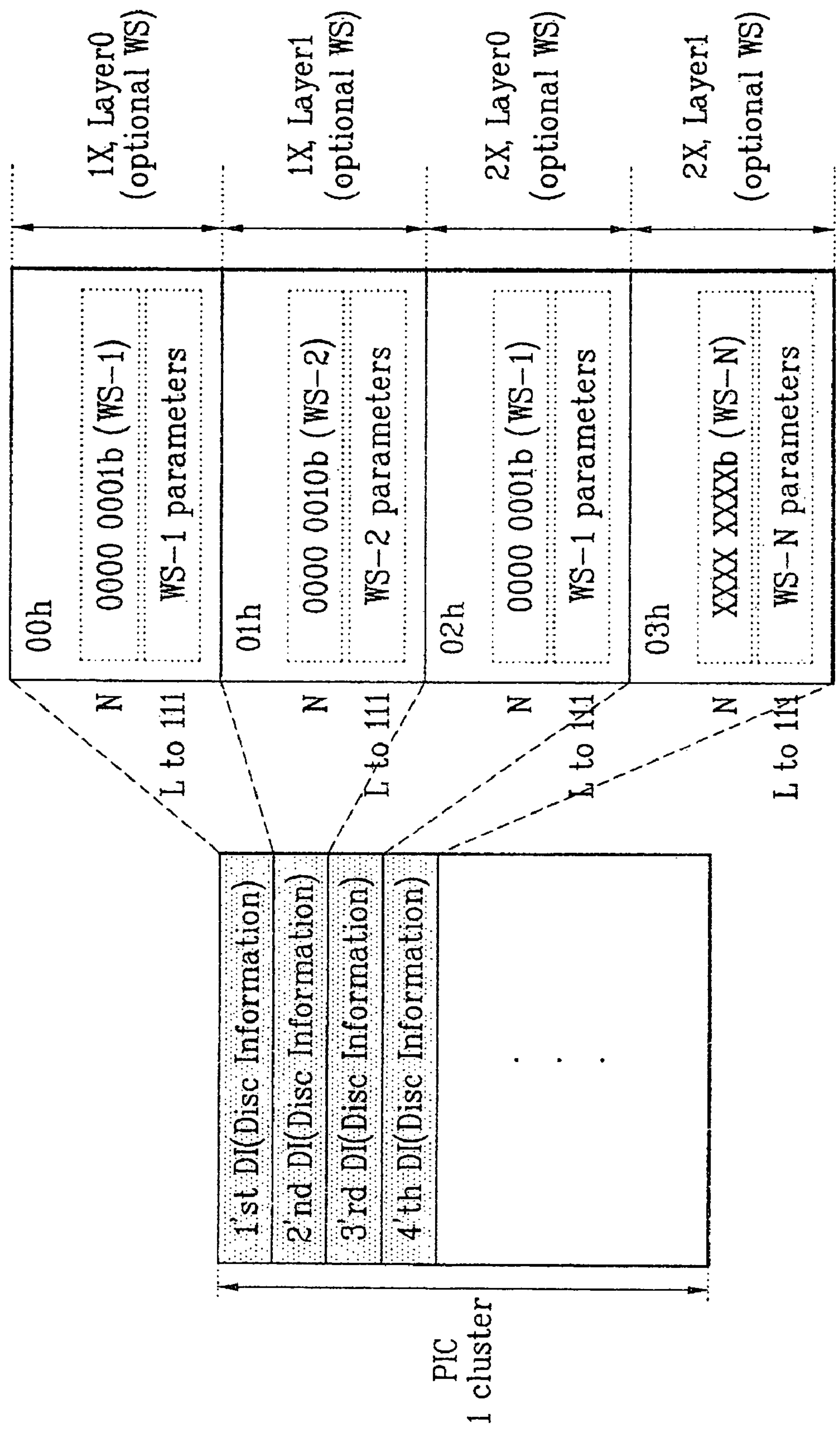
Figure 4D:
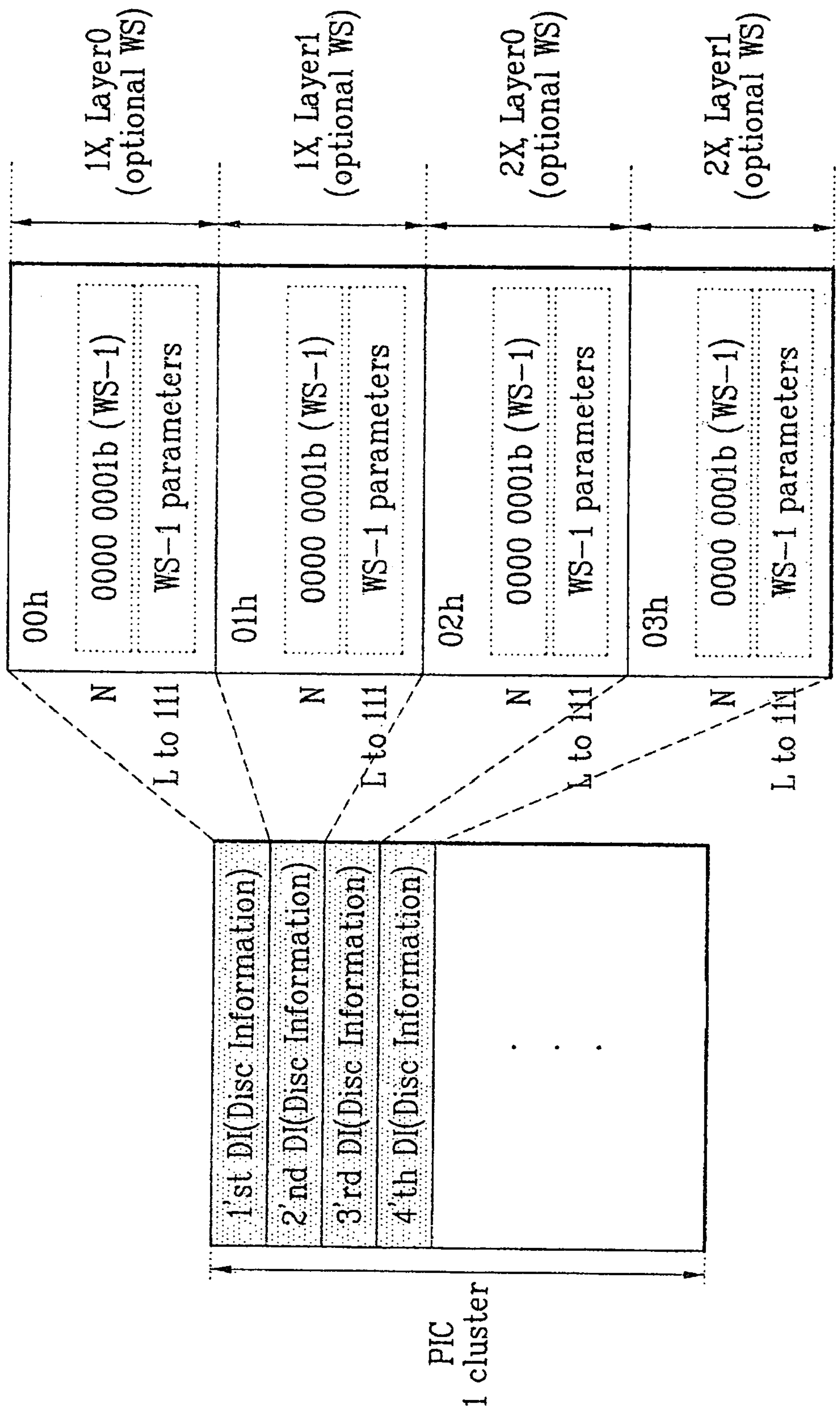
Figure 4E:
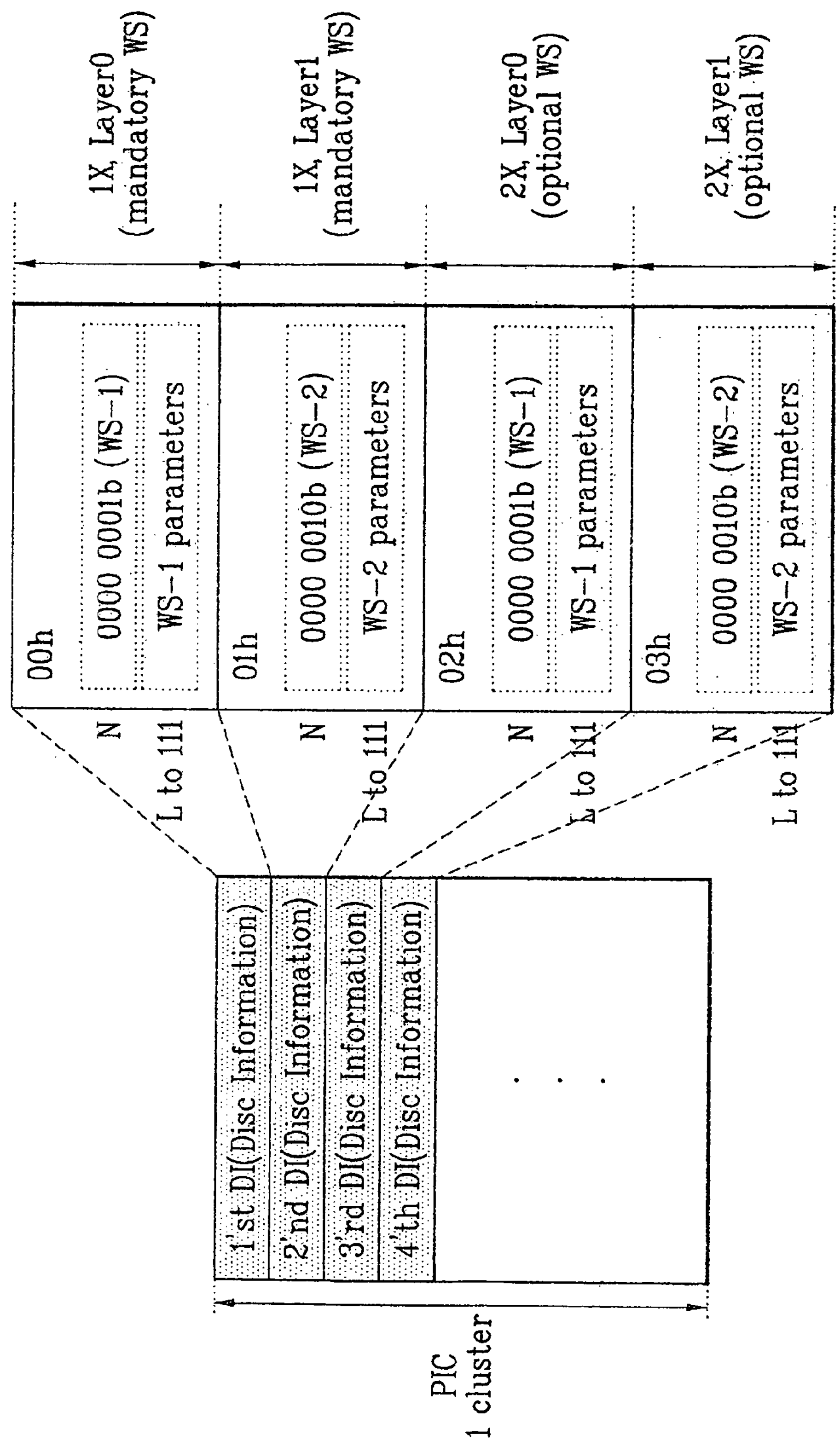

FIGS. 4C to 4E show specific embodiments for a method of recording the above-defined write strategy (WS) within disc information. FIG. 4C and FIG. 4D show the method that the write strategy (WS) is optionally selected to be recorded for the entire recording layers and recording velocities on manufacturing a disc. And, FIG. 4E shows a method of recording a previously determined write strategy (WS) in a mandatory manner in case of a specific recording velocity.

For convenience of explanation, it is assumed that a disc includes a dual layer and that 1× speed (1×) and 2× speed (2×) are applied to each recording layer.

FIG. 4C shows a case of enabling to optionally different record write strategies (WS) in the entire recording layers and at the entire recording velocities. For instance, disc information of 1× speed of a first recording layer Layer0 is recorded in '00h' as a disc information sequence and $1^{st}$ WS (WS-1) is selected to be recorded as a write strategy (WS). Disc information of 1× speed of a second recording layer Layer1 is recorded in '01h' and $2^{nd}$ WS (WS-2) is selected to be recorded as a write strategy (WS). Disc information of 2× speed of the first recording layer Layer0 is recorded in '02h' and $1^{st}$ WS (WS-1) is selected to be recorded as a write strategy (WS). And, disc information of 2× speed of the second recording layer Layer1 is recorded in '03h' and $N^{th}$ WS (WS-N) is selected to be recorded as a write strategy (WS). In such a case, write strategy parameters for $1^{st}$ WS (WS-1), e.g., (n−1) write strategy type, to be used for 1× speed of a first recording layer (Layer 0) may have different values from that to be used for 2× speed of the a first recording layer (Layer 0).

FIG. 4D shows another example of enabling to optionally record a write strategy (WS), in which the same type of write strategy (WS) is applied to disc information relating to the entire recording layers and recording velocities. In such a case, write strategy parameters for specific recording layer and/or writing speed may have different values from that for other recording layer and/or writing speed respectively.

Namely, since it is able to record a write strategy optionally, a disc manufacturer enables to apply one most reliable write strategy (WS) to the entire disc information identically. And, FIG. 4D illustrates a case that $1^{st}$ WS (WS-1) is recorded in the entire disc information.

FIG. 4E shows a method of recording a write strategy (WS) previously determined in a mandatory manner in case of a specific recording velocity or a write strategy (WS) optionally in case of a rest recording velocity. Generally, write strategy (WS) for 1× speed is the most important write strategy of which specific method is previously decided by a specified decision and a disc manufacturer enables to optionally record the rest recording velocities except the 1× speed. Yet, in case of a high-speed disc, it is apparent that the recording velocity decided in a mandatory manner can be 2× speed, 3× speed, or the like as well as 1× speed.

For instance, if a write strategy (WS) type mandatory for the 1× speed is $1^{st}$ WS (WS-1), disc information for 1× speed of a first recording layer is written in '00h' and '01h' as a disc information sequence and the $1^{st}$ WS (WS-1) should be written as the write strategy (WS) in a mandatory manner. Disc information for 2× speed of the first recording layer is written in '02h' and '03h' and $2^{nd}$ WS (WS-2) is selected to be recorded as the write strategy (WS) that can be optionally recorded. Hence, if the write strategy (WS) type mandatory for 1× speed is the $2^{nd}$ WS (WS-2), it is apparent that the $2^{nd}$ WS (WS-2) should be recorded in a mandatory manner as well as '00h' and '01h' as the disc information sequence record the disc information of 1× speed therein.

In applying the case of FIG. 4E, one of a plurality of specified write strategies is uniformly written as the 1× speed write strategy (WS) in a mandatory manner, thereby enabling to secure more disc recording characteristics. And, a disc manufacturer enables to optionally record one of a plurality of the specified write strategies uniformly for the rest recording velocities except the 1× speed, whereby a disc manufacturing process time can be shortened.

Besides, in specific case of FIG. 4E, it is also able to record the mandatory write strategy (WS) for 1× speed as well as a disc manufacturer enables to optionally record other write strategy (WS) for 1× speed separately. In such a case, the disc information for 1× speed can include disc information including the specified mandatory write strategy (WS) and different disc information including the optional write strategy (WS). This will be explained in the description of a second embodiment of the present invention (FIGS. 5A to 7) in detail later.

FIGS. 5A to 7 show a method of recording disc information of an optical disc according to a second embodiment of the present invention. The second embodiment of the present invention is characterized in that at least one write strategy (WS) is configured for a same writing speed/recording layer. Namely, a plurality of disc informations associated with the same writing speed/recording layer can exist to be classified by WS types, respectively.

Figure 5B:
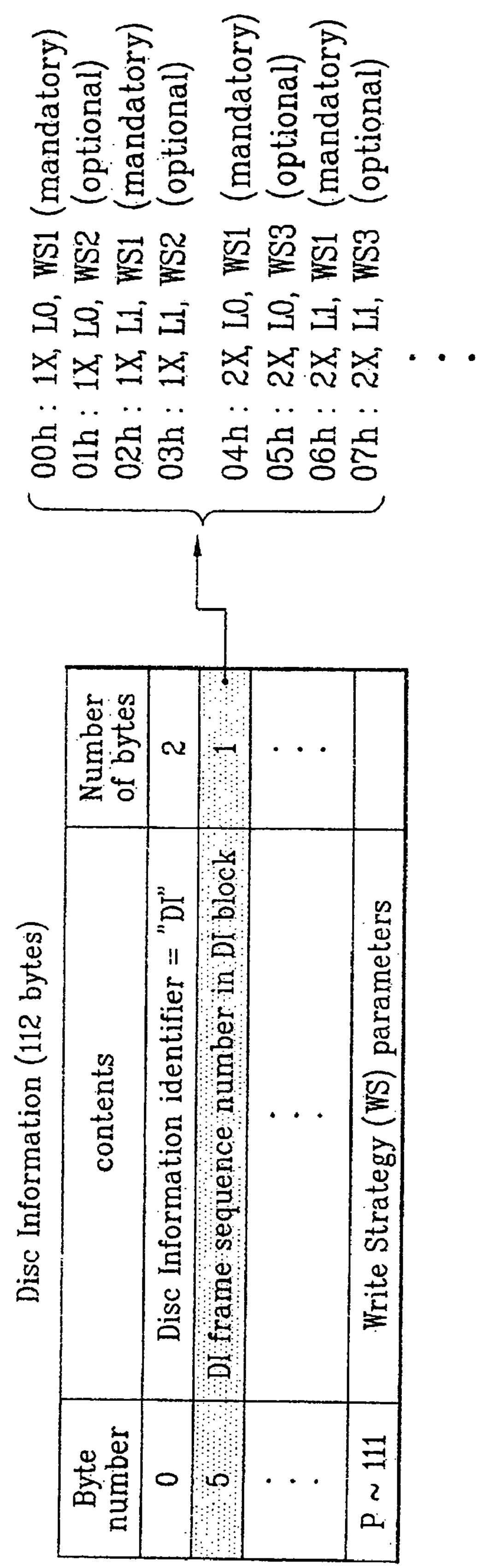

FIG. 5A and FIG. 5B show concepts of the method of recording disc information of the optical disc according to the second embodiment of the present invention, in which a sequence for disc information each is decided by a sequence number and is recorded by 1-byte.

For instance, the corresponding information is recorded in $5^{th}$ byte within disc information, is named 'DI frame sequence number in DI block', and is briefly represented by '00h, 01h, 02h, . . . '. Namely, if the information of the $5^{th}$ byte is '00h', it means $1^{st}$ disc information. If the information of the $5^{th}$ byte is '07h', it means $8^{th}$ disc information.

In configuring disc information, the present invention is characterized in that disc information is separately provided per writing speed, per recording layer, and per write strategy (WS) and that a configuration sequence of a plurality of the separately provided disc informations is uniformly decided according to a predetermined manner.

For instance, if a corresponding optical disc includes a pair of recoding layers and a plurality of WS types exist, disc informations can be configured in a following manner.

'00h' of $1^{st}$ disc information is related to 1× speed, $1^{st}$ recording layer L0, and WS1. '01h' of $2^{nd}$ disc information is related to 1× speed, $1^{st}$ recording layer L0, and WS2. '02h' of $3^{rd}$ disc information is related to 1× speed, $2^{nd}$ recording layer L0, and WS1. '03h' of $4^{th}$ disc information is related to 1× speed, $2^{nd}$ recording layer L1, and WS2. '04h' of $5^{th}$ disc information is related to 2× speed, $1^{st}$ recording layer L0, and WS2. '05h' of $6^{th}$ disc information is related to 2× speed and $1^{st}$ recording layer L0, and WS3. '06h' of $7^{th}$ disc information is related to 2× speed, $2^{nd}$ recording layer L1, and WS1. And, '07h' of $8^{th}$ disc information is related to 2× speed, $2^{nd}$ recording layer L1, and WS3.

Namely, in configuring disc informations, the second embodiment according to the present invention is characterized in that at least one disc information is configured per writing speed, the respective per writing speed disc informations are reconfigured per recording layer, and at least one WS type is provided to each recording layer.

Hence, in configuring disc informations for the same writing speed/recording layer, it is able to configure a plurality of disc informations according to WS types.

FIG. 5A shows that a disc manufacturer arbitrarily selects to record the entire WSs for the same writing speed/recording layer, in which the WS recorded in the entire disc informations becomes 'optional WS'.

FIG. 5B, shows that the WS decided in a mandatory manner is applied to a portion of a plurality of disc informations for a same writing speed/recording layer and that the WS arbitrarily selected by a disc manufacturer is applied to the rest of a plurality of the disc information, in which 'mandatory WS' is recorded in a front one of a plurality of the disc informations for the same writing speed/recording layer and 'optional WS' is recorded in the disc information following the front one.

In FIG. 5B, $1^{st}$ WS (WS-1) is taken as an example of 'mandatory WS' at 1× speed or 2× speed. Yet, it is apparent that the 'mandatory WS' for 1× speed can be different from that for 2× speed according to a decision of a corresponding specification.

Figure 6A:
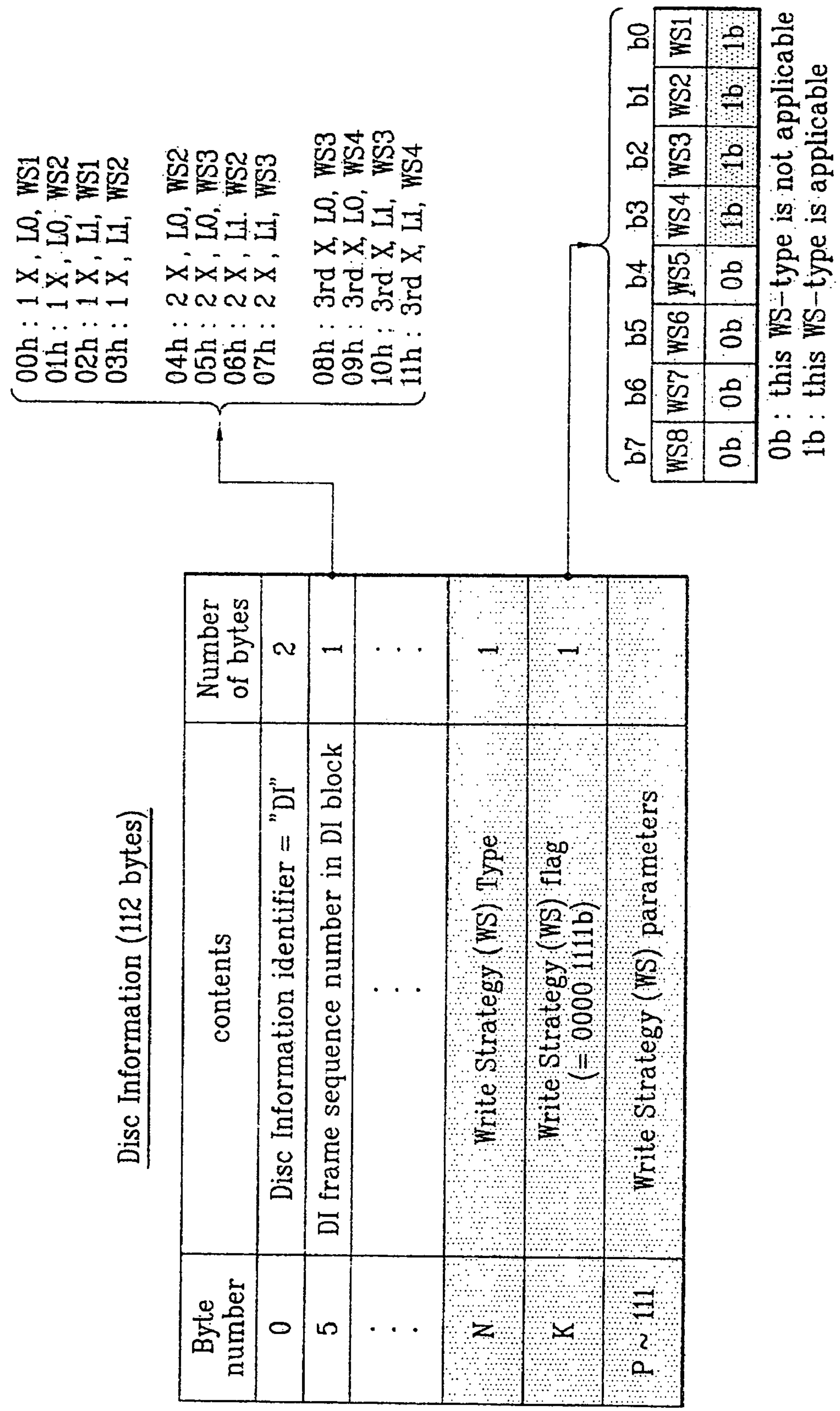

FIG. 6A shows an example of configuring disc information according to the second embodiment of the present invention.

Referring to FIG. 6A, 'DI frame sequence number in DI block' is provided to $5^{th}$ byte of each disc information to mean a sequence, which means that disc informations are configured in a specific order (writing speed→recording layer→WS type).

And, 'Write Strategy (WS) Type' filed is provided to a specific area ($N^{th}$ byte) within disc information and WS type information is written in the corresponding field.

Moreover, information of informing a type of write strategy (WS) applicable by a specification of a corresponding disc is recorded in another specific area ($K^{th}$ byte) within the disc information, which is named 'Write Strategy (WS) flag' field. For instance, whether a specific write strategy (WS) of eight types of write strategies (WS) is applicable by the corresponding disc is represented by 1-bit each in the same area having 1-byte allocated thereto. Namely, it can be defined that the corresponding write strategy (WS) is not applicable (supported) if a bit value is '0b' in entire bits or that the corresponding write strategy (WS) is applicable (supported) if the bit value is '1b'. Hence, each of the bits b0~b7 within 1-byte becomes flag information indicating applicability of a specific write strategy (WS). For instance, if $1^{st}$ to $3^{rd}$ type write strategies WS1 to WS3 are applicable by a corresponding disc only, '0000 0111b' is written in $L^{th}$ byte. If all of the eight types of write strategies (WS1 to WS8) are applicable, '1111 1111b' is written in the $L^{th}$ byte. In FIG. 6A, '0000 1111b' is written in the $K^{th}$ byte to indicate that four WS types WS1 to WS4 are applicable.

Specifically, it may be able to record disc information per write strategy (WS) type in configuring the disc informations. Yet, in such a case, the number of the recorded disc informations excessively increases. Moreover, a disc manufacturer should test the entire write strategy (WS) types and record the test results within the disc information, whereby it becomes a burden.

Therefore, in the embodiment according to the present invention, write strategies (WS) of which number (m) is smaller than that (n) of the maximum applicable write strategy types are recordable within disc information and a disc manufacturer further enables to optionally record a specific one of a plurality of write strategies (WS), whereby disc manufacturer's convenience is secured as well as an efficient recording of disc information is enabled.

In FIG. 6A, recording is performed at 1× speed (1×) using $1^{st}$ and $2^{nd}$ type write strategies WS1 and WS2, at 2× speed (2×) using $2^{nd}$ and $3^{rd}$ type write strategies WS2 and WS3, or at $3^{rd}$ writing speed (3×) using $3^{rd}$ and $4^{th}$ type write strategies WS3 and WS4.

Namely, it is able to record disc information using write strategy (WS) types (two types) less than total applicable write strategy (WS) types (four types) per writing speed. And, the intrinsic write strategy (WS) applied to each disc information can be confirmed or verified via 'Write Strategy (WS) Type' field ($N^{Th}$ byte) and 'Write Strategy (WS) parameters' filed ($P^{th}$~$111^{th}$ bytes).

Figure 6B:
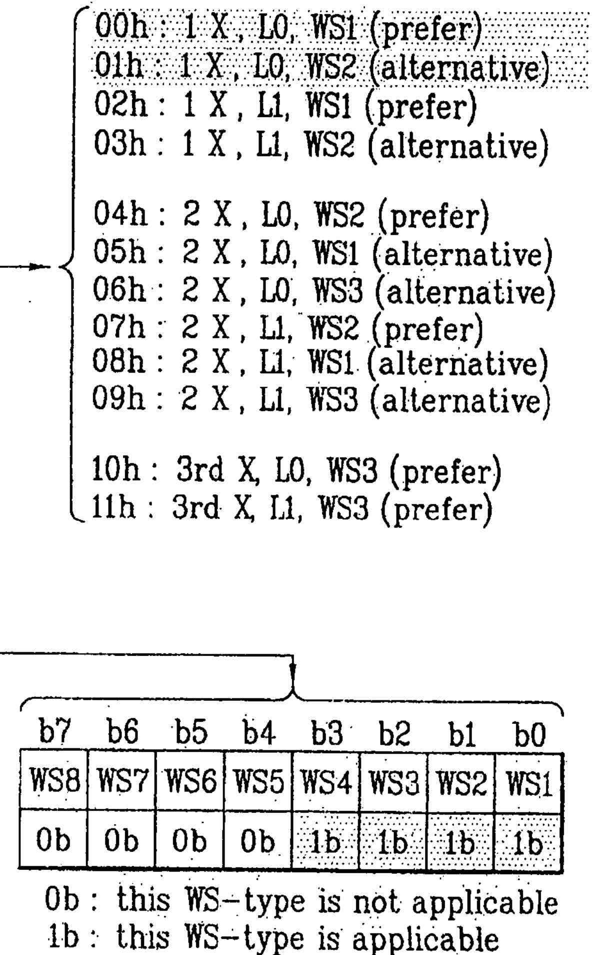

FIG. 6B shows another example of recording disc information according to the second embodiment of the present invention. Like FIG. 6A, four applicable write strategy types exist and '0000 1111b' is written in $K^{th}$ byte.

Specifically, in configuring disc information using one of a plurality of applicable write strategies (WS), at least one disc information is configured per the same writing speed and recording layer. In doing so, the most preferentially provided disc information is defined as preferred WS provided by a disc manufacturer and another disc information following the preferred WS is defined as alternative WS.

Namely, both disc information '00h' and disc information '01h' relate to 1× speed (IX) and $1^{st}$ recording layer (L0). Yet, the WS1 type information recorded in '00h' as preferentially provided disc information becomes the preferred WS and the WS1 type information recorded in '01h' as a next provided one becomes the alternative WS.

And, disc information '04h', disc information '05h', and disc information '06h' relate to 2× speed (2×) and $1^{st}$ recording layer (L0). Yet, the WS2 type information recorded in '04h' as preferentially provided disc information becomes the preferred WS, and the WS1 type information recorded in '05h' and the WS3 type information recorded in '06h' as next provided ones become the alternative WSs, respectively. Namely, they can be applied to at least three disc informations of the same writing speed/recording layer.

Moreover, disc information '10h' relates to $3^{rd}$ speed ($3^{rd}$×) and $1^{st}$ recording layer (L0) and disc information '11h' relates to $3^{rd}$ speed ($3^{rd}$×) and $2^{nd}$ recording layer (L0). In case that only one WS type information is provided to the same writing speed/recording layer, the provided WS becomes the preferred WS.

Namely, when a disc manufacturer provides disc informations within a disc according to the previously determined specification, an optical record playback apparatus (FIG. 8) reads out the disc information in a specific order (e.g., writing speed→recording layer). If a plurality of disc informations exist on the same writing speed/recording layer, the optical record playback apparatus (FIG. 10) recognizes the preferentially provided WS within the disc information as the preferred WS and the next WS as the alternative WS additionally provided by a disc manufacturer, thereby enabling record playback using disc information efficiently.

Even if both of the preferred WS and the alternative WS are 'optional WS' a disc manufacturer enables to select optionally, it may be possible to render the preferred WS into 'mandatory WS' and the alternative WS into 'optional WS' only.

FIG. 7 shows another example of recording disc information according the second embodiment of the present invention, in which a disc manufacturer directly provides information of a most preferred write strategy (WS) type at a specific writing speed.

Referring to FIG. 7, 'Write Strategy (WS) Type' field ($N^{th}$ byte) and 'Write Strategy (WS) flag' field ($K^{th}$ byte) are recorded in $N^{th}$ and $K^{th}$ bytes within disc information, respectively. Meaning of each information recorded in the fields is the same of that in FIG. 6A and FIG. 6B.

And, 'Best WS flag in Writing speed' field is provided to another specific area ($Q^{th}$ byte) within disc information, whereby a disc manufacturer provides information of a WS indicating a best quality among a plurality of write strategies (WS) existing per same writing speed. For example, FIG. 7 shows that $2^{nd}$ WS (WS2) is the 'Best WS' of eight applicable WSs at a specific writing speed.

In case that a plurality of WSs enable to exist for the same writing speed/recording layer like FIG. 6A, an optical record playback apparatus (FIG. 8) is unable to distinguish which is the most appropriate WS for a corresponding writing speed. Hence, the optical record play back apparatus computes the optimal WS by applying the entire WSs provided to the disc information. Yet, by providing the 'Best WS flag in Writing speed' field to the $Q^{th}$ byte, it is able to apply to utilize the WS recorded in the $Q^{th}$ byte preferentially.

In case that a plurality of WSs exist for the same writing speed/recording layer like FIG. 6B, it is able to recognize the WS recorded in $1^{st}$ disc information as the preferred WS by a previously specified decided method. Yet, by providing the 'Best WS flag in Writing speed' field to the $Q^{th}$ byte, it is able to reconfirm the preferred WS as well. Moreover, in case that the preferred WS recorded in the $1^{st}$ disc information for the same writing speed/recording layer is different from the 'Best WS flag in Writing speed' information of the $Q^{th}$ byte, e.g., if the preferred WS is 'mandatory WS' decided in a mandatory manner, a priority is given to the information of the $Q^{th}$ byte provided by a disc manufacturer, thereby enabling to provide the information more efficiently in deciding the optimal WS at the same writing speed.

Figure 8:
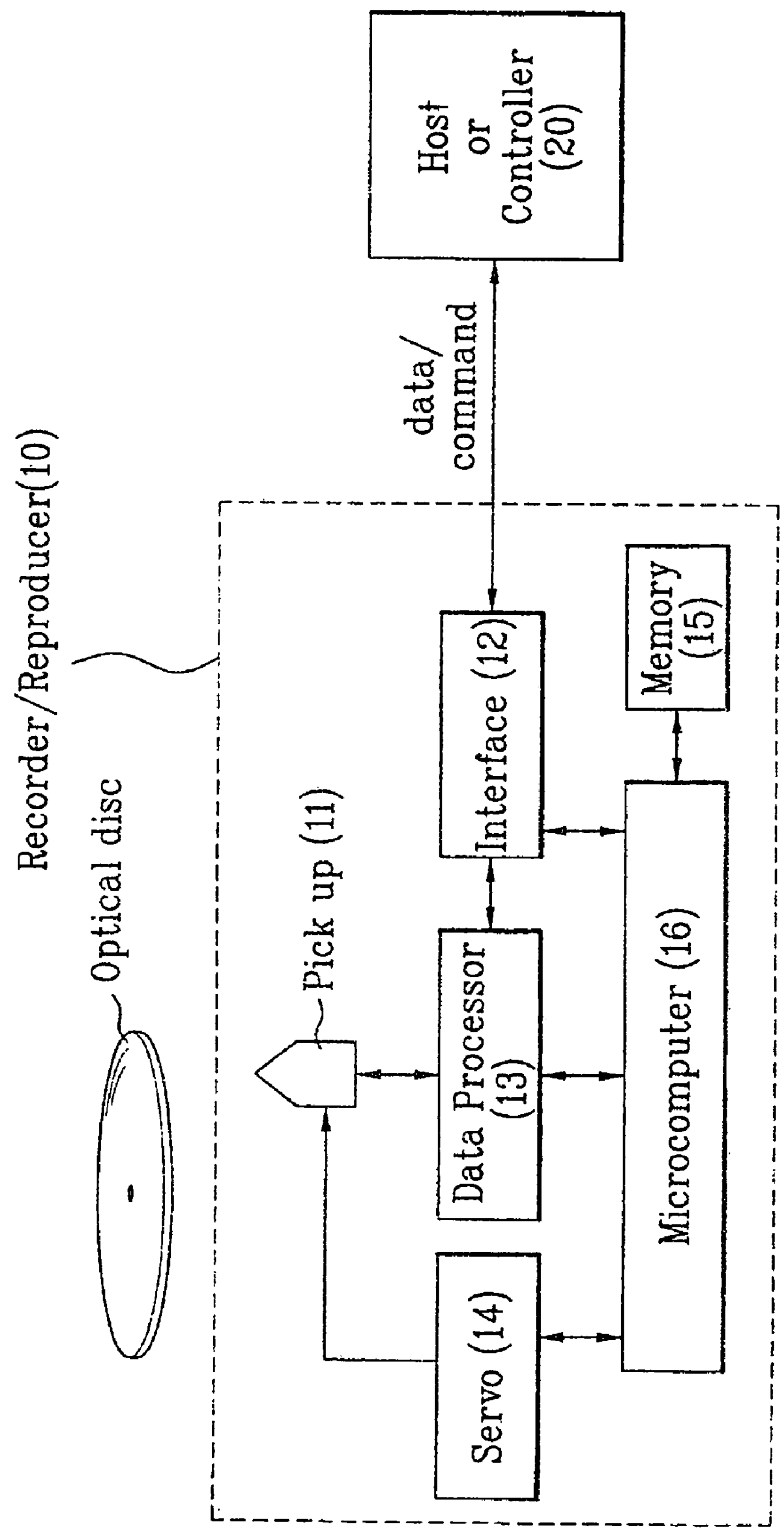
FIG. 8 is a block diagram of an optical disc recording and reproducing apparatus according to the present invention.

FIG. 8 is a block diagram of an optical disc record playback according to the present invention.

Referring to FIG. 8, a record playback apparatus according to the present invention includes a record playback unit 10 carrying out record playback on an optical disc and a control unit 20 controlling the record playback unit 10.

The control unit 20 gives a record or playback command for a specific area, and the record playback unit 10 caries out the record/playback for the specific area according to the command of the control unit 20. Specifically, the record playback unit 10 includes an interface unit 12 performing communications with an external device, a pickup unit 11 directly recording data on the optical disc or playing back the data, a data processor 13 receiving a playback signal from the pickup unit 11 to restore into a necessary signal value or modulating to deliver a signal to be recorded into a signal to be recorded on the optical disc, a servo unit 14 reading out a signal from the optical disc correctly or controlling the pickup unit 11 to record a signal on the optical disc correctly, a memory 15 temporarily storing disc control information including disc control information, and a microcomputer 16 responsible for controlling the above-described elements within the record playback unit 10.

A recording process of an optical disc according to the present invention is explained in detail as follows.

First of all, once an optical disc is loaded in the optical record playback apparatus, the entire disc management information within the disc is read out to be temporarily stored in the memory 15 of the record playback unit 10. Also, a specific disc management information only can be read from the optical disc. And, various kinds of the disc management information are utilized for the record/playback of the optical disc. Specifically, the management information stored in the memory 15 includes disc control information of the present invention. Hence, the recording layer information, writing speed information, and write strategy fitting the corresponding writing speed recorded within the disc information are read out to be stored in the memory.

If intending to perform a recording on a specific area within the optical disc, the control unit 20 renders such an intent into a writing command and then delivers it to the record playback unit 10 together with data for writing location information to be recorded. After receiving the writing command, the microcomputer 16 decides or selects the corresponding writing speed to be applied to an intended recording layer within the optical disc from the management informations stored in the memory 15 and then performs the writing command using a (pre-)determined or selected write strategy type and the write strategy parameters applicable to the decided or selected writing speed.

Specifically, in the present invention, the disc information as management information is provided in a specific order and the microcomputer 16 recognizes which WS is the preferred WS of the disc manufacturer in the same writing speed and recording layer. Therefore, it is more facilitated to perform the recording on a specific recoding layer within an optical disc at a specific writing speed.

Accordingly, the present invention provides various methods of providing disc control information coping with higher writing speed in a high-density optical disc, thereby enabling to uniformly apply the standardized disc control information to efficiently cope with the record/playback of the optical disc.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A recording medium having data structure of a control information with at least one recording layer, the control information including at least two information units for lower writing speed and higher writing speed, the first information unit for lower writing speed includes write strategy parameters for first write strategy type to be used for the lower writing speed, wherein the first write strategy type is a mandatory type to be used for at least the lower writing speed and one of a plurality of write strategy types applicable to the lower writing speed, and the second information unit for higher writing speed includes write strategy parameters for a write strategy type to be used for the higher writing speed, wherein the write strategy type for the higher writing speed is same as the first write strategy type, or a write strategy type different than the first write strategy type, and a preferred type determined based on a preference among the plurality of write strategy types applicable to the higher writing speed.

2. The recording medium as claimed in claim 1, wherein the write strategy parameters for the higher writing speed are different from the write strategy parameters for the lower writing speed even if the same write strategy type is used.

3. The recording medium as claimed in claim 1, wherein the second information unit includes identification information identifying the second information unit with the write strategy type.

4. The recording medium as claimed in claim 3, wherein the identification information identifies the second information unit with one of an n−1 write strategy type and an n/2 write strategy type, where n is a length of a mark and each type represents a number of write pulses to form a corresponding mark.

5. The recording medium as claimed in claim 1, wherein the first information unit for lower writing speed is followed by the second information unit for the higher writing speed with respect to a position.

6. The recording medium as claimed in claim 1, wherein the control information further includes alternative information unit for the lower writing speed, which includes write strategy parameters for second write strategy type different from the first write strategy type, wherein the second write strategy type is an optional or alternative type to be used optionally or alternatively for at least the lower writing speed.

7. The recording medium as claimed in claim 6, wherein the alternative information unit for the second write strategy type is preceded by the first information unit for the first write strategy type with respect to a recording order.

8. The recording medium as claimed in claim 1, wherein the control information further includes alternative information unit for the higher writing speed, which includes write strategy parameters for alternative write strategy type different from the write strategy type to be used for the second information unit, wherein the alternative write strategy type is an optional or alternative type to be used optionally or alternatively for at least the higher writing speed.

9. The recording medium as claimed in claim 8, wherein the alternative write strategy type is an n−1 write strategy type or an n/2 write strategy type, where n is a length of a mark and each type represents a number of write pulses to form a corresponding mark.

10. The recording medium as claimed in claim 8, wherein the write strategy type for the higher writing speed is one of an n−1 write strategy type and an n/2 write strategy type, and the alternative write strategy type is one of an n−1 write strategy type and an n/2 write strategy type, which is different from the former write strategy type, where n is a length of a mark and each type represents a number of write pulses to form a corresponding mark.

11. The recording medium as claimed in claim 8, wherein the alternative information unit for the alternative write strategy type for the higher writing speed is preceded by the second information unit for the write strategy type for the higher writing speed with respect to a recording order.

12. A recording method comprising:

reading a control information from a specific area of a recording medium, the control information including a first information unit for a lower writing speed and a second information unit for a higher writing speed, wherein the first information unit for lower writing speed includes write strategy parameters for first write strategy type to be used for the lower writing speed, wherein the first write strategy type is a mandatory type to be used for at least the lower writing speed and one of a plurality of write strategy types applicable to the lower writing speed, and the second information unit for higher writing speed includes write strategy parameters for a write strategy type to be used for the higher writing speed, wherein the write strategy type for the higher writing speed is same as the first write strategy type, or a write strategy type different than the first write strategy type, and a preferred type determined based on a preference among the plurality of write strategy types applicable to the higher writing speed; and recording data at a specific writing speed based on at least one information unit among the first and second information units.

13. The method as claimed in claim 12, further comprising:

identifying one of first and second information units based on identification information identifying a corresponding information unit with a specific write strategy type and/or a speed information indicating a specific writing speed; and recording data at the specific writing speed based on at least one information unit as a result of the identifying step.

14. The method as claimed in claim 13, wherein the identification information identifies the corresponding information unit with one of an n−1 write strategy type and an n/2 write strategy type, where n is a length of a mark and each type represents a number of write pulses to form a corresponding mark.

15. The method as claimed in claim 12, wherein the write strategy parameters for the higher writing speed are different from the write strategy parameters for the lower writing speed even if a same write strategy type is used.

16. The method as claimed in claim 12, further comprising:

determining a writing speed to record data; and selecting at least one of the first and second information units from the read control information based on the determining step.

17. The method as claimed in claim 12, wherein the first information unit for the lower writing speed is followed by the alternative information unit for the lower writing speed, further comprising:

identifying the mandatory or preferred write strategy type for the lower writing speed to be considered mandatorily or preferentially based on the recording order of the first information unit and the alternative information unit.

18. The method as claimed in claim 12, wherein the second information unit for the higher writing speed is followed by the alternative information unit for the higher writing speed, further comprising:

identifying the mandatory or preferred write strategy type for the higher writing speed to be considered mandatorily or preferentially based on the recording order of the second information unit and the alternative information unit.

19. An apparatus for reproducing and recording data on a recording medium, comprising:

an optical pickup configured to read control information from a specific area of the recording medium, the control information including a first information unit for a lower writing speed and a second information unit for a higher writing speed, wherein the first information unit for lower writing speed includes write strategy parameters for first write strategy type to be used for the lower writing speed, wherein the first write strategy type is a mandatory type to be used for at least the lower writing speed and one of a plurality of write strategy types applicable to the lower writing speed, and the second information unit for higher writing speed includes write strategy parameters for a write strategy type to be used for the higher writing speed, wherein the write strategy type for the higher writing speed is same as the first write strategy type, or a write strategy type different than the first write strategy type, and a preferred type determined based on a preference among the plurality of write strategy types applicable to the higher writing speed; and a controller, operatively coupled to the optical pickup, configured to control the optical pickup to record data at a specific writing speed based on at least one information unit among the first and second information units.

20. The apparatus as claimed in claim 19, wherein the controller is configured to identify one of first and second information units based on an identification information identifying a corresponding information unit with a specific write strategy type and/or a speed information indicating a specific writing speed, and the controller is configured to control the optical pickup to record data at the specific writing speed based on at least one information unit as a result of the identifying step.

21. The apparatus as claimed in claim 20, wherein the identification information identifies the corresponding information unit with one of an n−1 write strategy type and an n/2 write strategy type, where n is a length of mark and each type represents a number of write pulse to form a corresponding mark.

22. The apparatus as claimed in claim 19, wherein the write strategy parameters for the higher writing speed are different from the write strategy parameters for the lower writing speed even if a same write strategy type is used.

23. The apparatus as claimed in claim 19, wherein the controller is configured to determine a writing speed to record data, and the controller is configured to select at least one of the first and second information units from the read control information based on the determination.

24. The apparatus as claimed in claim 19, wherein the first information unit for the lower writing speed is followed by the alternative information unit for the lower writing speed, wherein the controller is configured to identify the mandatory or preferred write strategy type for the lower writing speed to be considered mandatorily or preferentially based on the recording order of the first information unit and the alternative information unit.

25. The apparatus as claimed in claim 19, wherein the second information unit for the higher writing speed is followed by the alternative information unit for the higher writing speed, wherein the controller is configured to identify the mandatory or preferred write strategy type for the higher writing speed to be considered mandatorily or preferentially based on the recording order of the second information unit and the alternative information unit.

26. An apparatus for recording data on a recording medium, comprising:

a memory configured to store control information including a first information unit for a lower writing speed and a second information unit for a higher writing speed, wherein the first information unit includes write strategy parameters for a first write strategy type to be used for the lower writing speed, the first write strategy type being a mandatory type to be used for at least the lower writing speed and one of a plurality of write strategy types applicable to the lower writing speed, and the second information unit includes write strategy parameters for a write strategy type to be used for the higher writing speed, the write strategy type for the higher writing speed being same as the first write strategy type, or a write strategy type different than the first write strategy type, and a preferred type determined based on a preference among the plurality of write strategy types applicable to the higher writing speed; and an optical pickup configured to read or record data from or on the recording medium;

a controller, operatively coupled to the memory and optical pickup, configured to determine a writing speed to record the data on the recording medium, identify a write strategy type usable at the determined writing speed and control the optical pickup to record the data by using corresponding write strategy parameters for the write strategy type.

27. The apparatus of claim 26, wherein the controller is configured to further identify one of first and second information units based on identification information identifying a corresponding information unit with a specific write strategy type and/or speed information indicating a specific writing speed, and the controller is configured to control the optical pickup to record the data at the determined writing speed based on at least one information unit as result of the identification.

28. The apparatus as claimed in claim 27, wherein the identification information identifies the corresponding information unit with one of an n−1 write strategy type and an n/2 write strategy type, where n is a length of a mark and each type represents a number of pulses to form a corresponding mark.

29. The apparatus of claim 28, wherein the optical pickup is configured to record the data using the number of pulses one less than the mark length to form a corresponding mark if the n−1 write strategy type is applied, or using the number of pulses corresponding to half the mark length to form a corresponding mark if the n/2 write strategy is applied, an integer number of pulses from the result being only available, according to the control of the controller.

30. The apparatus of claim 29, wherein the controller is configured to control the optical pickup to record the data using the n−1 write strategy type at the specific writing speed on the corresponding recording layer.

31. The apparatus of claim 29, wherein the controller is configured to control the optical pickup to record the data using the n/2 write strategy type at the specific writing speed on the corresponding recording layer.

32. The apparatus of claim 26, wherein the write strategy parameters for the higher writing speed are different from the write strategy parameters for the lower writing speed even if the same write strategy type is used.

33. The apparatus of claim 26, wherein the first information unit for the lower writing speed is followed by the alternative information unit for the lower writing speed, wherein the controller is configured to identify the mandatory write strategy type for the lower writing speed to be considered mandatorily based on the recording order of the first information unit and the alternative information unit.

34. The apparatus of claim 26, wherein the second information unit for the lower writing speed is followed by the alternative information unit for the higher writing speed, wherein the controller is configured to identify the preferred write strategy type for the higher writing speed to be considered preferentially based on the recording order of the second information unit and the alternative information unit.

35. The apparatus of claim 26, further comprising:

a servo, operatively coupled to the optical pickup, configured to control a servo operation of the optical pickup according to the determined writing speed.

* * * * *